United States Patent [19]
Klose

[11] Patent Number: 4,820,373
[45] Date of Patent: Apr. 11, 1989

[54] APPARATUS FOR APPLYING TREAD STOCK TO A TIRE CARCASS

[75] Inventor: Karl W. Klose, Findlay, Ohio

[73] Assignee: Cooper Tire & Rubber Company, Findlay, Ohio

[21] Appl. No.: 911,031

[22] Filed: Sep. 24, 1986

[51] Int. Cl.$^4$ .............................................. B29D 30/30
[52] U.S. Cl. .............................. 156/405.1; 156/128.1; 156/414
[58] Field of Search ...................... 156/123, 128.1, 130, 156/133, 405.1, 414, 543; 226/170; 198/780, 469.1

[56] References Cited

U.S. PATENT DOCUMENTS

| | | |
|---|---|---|
| 1,762,752 | 6/1930 | Abbott, Jr. ............... 156/405.1 X |
| 2,473,067 | 6/1949 | Miller ..................... 156/405.1 X |
| 3,026,230 | 3/1962 | Nebout .................... 156/128.6 |
| 3,828,917 | 8/1974 | Oestergren ................ 198/780 X |
| 3,923,390 | 12/1975 | Susko ..................... 353/95 |
| 4,106,965 | 8/1978 | Lee ....................... 156/123 |
| 4,306,931 | 12/1981 | Klose ..................... 156/413 |
| 4,402,782 | 9/1983 | Klose et al. .............. 156/414 |
| 4,445,963 | 5/1984 | Klose et al. .............. 156/420 |
| 4,469,546 | 9/1984 | Klose ..................... 156/406.2 |

FOREIGN PATENT DOCUMENTS

3119135 12/1982 Fed. Rep. of Germany ... 156/405.1

Primary Examiner—Michael W. Ball
Assistant Examiner—Ramon R. Hoch
Attorney, Agent, or Firm—Biebel, French & Nauman

[57] ABSTRACT

A tire building method and apparatus applies a length of tred stock to a belt package or to a green tire carcass. The belt package or green tire carcass is mounted to a cylindrical building drum. The tread stock is then loaded outer face down onto an elongated, inclined servicer extending toward the drum. The stock is conveyed downwardly along the servicer to a delivery point located beneath the drum. The servicer is pivotally raised to bring the stock into contact with the materials on the drum, the stock at such point being directed to the drum to contact a lower portion of the drum along a line tangent to the periphery of the drum. During conveying of the stock along the servicer, the stock is retained in a centered position by engaging a groove or ridge formed along the outer side of the stock. Upon arrival of the stock beneath the drum, the drum is rotated, whereby the stock is adhered to the materials thereon and lifted away from the servicer onto the drum.

12 Claims, 5 Drawing Sheets

APPARATUS FOR APPLYING TREAD STOCK TO A TIRE CARCASS

BACKGROUND OF THE INVENTION

The present invention relates generally to the manufacture of rubber tires for wheeled vehicles, and more particularly, to a method and apparatus for applying a separately formed strip of tread stock to a previously assembled green tire carcass or to a belt package for subsequent application to a green tire carcass.

In manufacturing tires, the assembly of tire elements is generally completed when a separately formed strip or band of tread stock is attached to a green tire carcass, the tread stock being applied either individually or as a sub-assembly consisting of the belts and the tread stock. The tread stock is typically produced by extruding a continuous strip or band of uncured rubber, the extrusion having a cross-sectional shape that is generally hat-like, in that it includes a relatively massive central portion with thin extremities extending outwardly on either side at the lowermost edge of the stock. The strip or band is cut to suitable lengths for subsequent assembly on a green tire carcass or belt package.

The dimensional uniformity of any extruded shape is subject to many process variables. Thus, the thin outer extremities of the tread stock are susceptible to dimensional variation to such an extent that the extremities are generally not suitable as reference or guide points for handling and orienting the tread stock during its assembly to the carcass or the belt package. Because the central, more massive portion of the stock extrusion is dimensionally more uniform, tire manufacturers heretofore have generally focused attention on centrally locating the massive portion of the tread stock on the belt package or green tire carcass, with a lesser regard given to the positioning of the thin outer extremities.

In view of the foregoing, tire building machines and the tread stock servicers utilized therein for delivering stock are typically disigned to permit the building machine operator, through personal skill and substantial hand manipulation, to control and adjust the positioning of the tread stock as it is merged with and assembled to the belt package or green tire carcass.

To assist the machine operator in the orientation of the tread stock, a number of complex reference guide means have been developed. For example, U.S. Pat. No. 3,923,390, issued Dec. 2, 1975 to Susko, projects reference lines of light onto the surface of the belt and tread stock package being assembled. The projected lines are generally positioned to coincide with the rounded shoulder areas of the tread stock extrusion. A second example is disclosed in U.S. Pat. No. 3,026,230, issued Mar. 20, 1962 to Nebout.

As a result of these approaches, present tread stock servicer apparatus is generally configured so that the stock is oriented with the outermose surface (into which the tread will later be formed) in an upward position. The tread stock must therefore be delivered to the vicinity of the upper portion of the building drum supporting the belts or the green tire carcass, so that the tire building machine operator can visually observe the progress of tread stock application. When necessary, the operator may then utilize hand manipulation to control or adjust the positioning of the stock at the point where it merges with and is applied to the belts or green tire carcass.

The tread stock is delivered onto the belts along a line tangent to the circumference of the drum on which the building operation is performed. However, the foregoing requirements necessitate that the delivery end structure of the tread servicer be oriented within the angle of tangency between the stock and the building drum. Since the delivery end must have finite dimensions, it is physically impossible to have the tread stock servicer support and guide the tread stock at the exact point where the stock meets and is applied to the belts or green tire carcass carried on the drum, the point of greatest criticality in stock orientation.

Applying the tread stock to the belts or green tire carcass in other than a precisely centered manner can result, after the tread stock is assembled onto the green tire carcass, in a non-uniform displacement of rubber during the shaping stage of the curing process. This situation can result in a non-uniform tire. For example, consider a radial ply carcass on which the belts had been properly aligned and assembled. If the tread stock is applied either off center or in a crooked or wobbly manner, the unsymmetric or non-uniform lateral displacement of tread stock material may, during the shaping or curing process, result in a similar but opposite lateral displacement of one or more of the underlying belts. The presence of such laterally displaced belts in the finished, cured tire could adversely affect the tire's operating characteristics, and upon final inspection, such tires are discarded.

What is needed, therefore, is a tread stock servicer for a tire building machine that easily and reliably orients and positions the tread stock as it is brought into contact with the belts or green tire carcass positioned on the building drum. Such a servicer should reduce the skill and manipulation required on the part of the building machine operator, and shoul result in a higher degree of uniformity and symmetry in the application of the tread stock. In achieving these functions, such a servicer should support the tread stock as close as possible to the actual point of application of the stock to the building drum.

SUMMARY OF THE INVENTION

In meeting the foregoing needs, the present invention provides a method and apparatus for applying a length of tread stock to a green tire carcass or to the periphery of a belt package.

The apparatus in accordance with the present invention includes a cylindrical building drum to which a belt package or green tire carcass is applied. Means is provided for mounting the drum for circumferential rotation about a horizontal axis. An elongated servicer means includes a frame defining a delivery end and a loading end for delivering and directing the tread stock to the drum. A conveyor means located on the servicer means enables movement of the tread stock along the servicer means from the loading end to the delivery end.

The apparatus also includes means for retaining the tread stock in a centered position along the servicer means with respect to the drum during movement of the tread stock along the servicer. The servicer means is supported with the delivery end lower than the loading end. Further, the servicer means is supported in a working position with the delivery end disposed beneath the drum and spaced apart therefrom by a distance slightly greater than a thickness of the tread stock. At such time as the tread stock held by the servicer means is to be applied to the belt package or green tire carcass held by the building drum, the delivery end of the servicer means is raised to an angle with respect to the drum such that tread stock carried on the servicer means approaches and contacts a lower portion of the building drum along a line tangent to the peripery of the drum. As a result, the stock approaches the drum with the outer face down and away from the drum for application of the tread stock to the belt package or green tire carcass carried on the drum.

The conveyor means may include a support member attached to the frame, and a plurality of ball rollers carried on the support member.

The centering retaining means may include means for engaging and cooperating with a centering mark defined along the length of the tread stock. The engaging means may include an elongated plate disposed edgewise along a central line defined along the length of the servicer means, the upper periphery of the plate being formed for engaging the mark as the tread stock is moved therepast.

The servicer means may further include a guide roller disposed perpendicular at the delivery end for guiding the stock onto the surface of the drum. The guide roller defines an anular ridge or groove extending about the circumference of the guide roller, the ridge or groove being aligned on the guide roller for engagement of the centering mark on the thread stock moved therepast.

Means may also be provided for moving the servicer means to and from the working position by raising the delivery end toward the drum and lowering the delivery end away from the drum. The servicer means is pivotally connected to the frame near the loading end, and the moving means causes pivotal movement of the servicer means with respect to the frame.

The tire building method of the present invention includes the steps of assembling a belt package or green tire carcass to a cylindrical drum. The tread stock is loaded onto the elongated, inclined servicer means at its loading end. A centering mark formed on the tread surface of the stock is engaged with a centering means. The tread stock is then conveyed downwardly along the servicer means from the loading end to the delivery end disposed beneath the drum and spaced apart therefrom by a distance slightly greater than a thickness of the tread stock. The tread stock is conveyed to approach the drum at an angle such that the stock approaches a lower portion of the belt package or green tire carcass on the drum along a line tangent to the periphery of the drum.

During conveying of the tread stock along the servicer, the tread stock is retained in a centered position along the servicer means with respect to the drum by the centering means. Upon arrival of the lower portion of the tread stock beneath the drum and its coming into contact with the periphery of the materials previously assembled upon the drum, the drum is rotated in a direction coresponding to the direction of advance of the tread stock, whereby the tread stock is adhered to the belt package or green tire carcass on the drum and lifted away from the servicer.

The method may include the further steps of initially positioning the servicer means with the delivery end of the servicer means being spaced from a lower portion of the drum, halting the conveying of the stock upon arrival of the stock at the delivery end, raising the servicer means to cause the stock to contact the belt package on the drum, and releasing the stock for movement upon rotation of the drum.

Accordingly, it is an object of the invention to provide a method and apparatus for applying a length of tread stock to the periphery of a green tire carcass or a belt package for subsequent application to a green tire carcass that easily and reliably orients and positions the tread stock as it is brought into contact with the green tire carcass or belt package; to provide such a method and apparatus that reduces the skill and manipulation required on the part of the operator in locating the tread stock on the green tire carcass or belt package; to provide such a method and apparatus that will improve the uniformity and symmetry of the applied tread stock; to provide such a method and apparatus that supports and centers the tread stock up to and including the actual point of application; and to provide such a method and apparatus that enables the operator to better observe the position of the tread stock as it is applied to the green tire carcass or belt package.

Other objects and advantages of the present invention will be apparent from the following description, the accompanying drawings, and the appended claims.

DETAILED DESCRIPTION OF THE PREFERRED EMBODIMENTS

Figure 1:
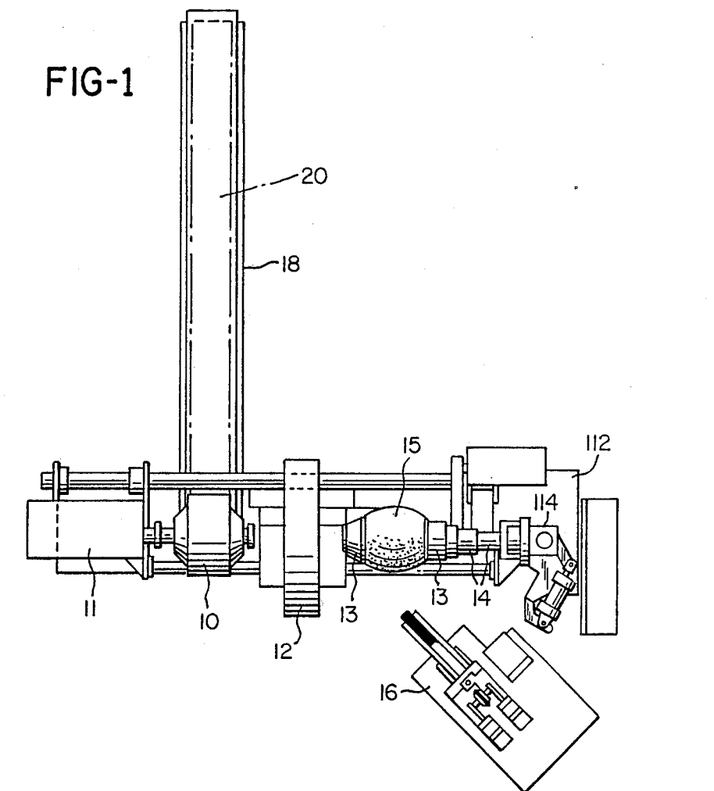
FIG. 1 is a plan view of a tire building machine with which the method and apparatus of the present invention may be used.

Referring now to FIG. 1, a second stage tire building machine is shown that incorporates the apparatus for the application of tread stock to a belt package for subsequent application to a green tire carcass in accordance with the present invention.

The tire building machine includes a radially expansible and collapsible building drum 10 upon which a belt and tread stock package is assembled. Specific details regarding an appropriate drum 10 may be seen by reference to U.S. Pat. No. 4,445,963, issued May, 1, 1984 to Klose et al. Conventional belt material is supplied from a servicing apparatus (not shown but situated coincidental and above tread servicer 18) and positioned upon the drum 10. The tread stock is then applied and positioned onto the belts previously applied to drum 10. The building drum 10 is provided with a rotary drive means 11 connected thereto, so that the drum 10 may be rotated about its horizontal axis during application of both the belt material and the tread stock.

In the event a tire is manufactured that does not include belt material, the tread stock may be applied directly to the green tire carcass. The present invention is equally usable in such a case.

A transfer ring 12 transfers the assembled belt and tread stock package from building drum 10 to a final assembly portion of the machine for final assembly to a first stage tire carcass and stitching. Transfer ring 12 is configured to contract radially about the belt and tread stock package in order to transfer the package axially from building drum 10 to the final assembly portion. Details of an appropriate construction for ring 12 may be seen by reference to U.S. Pat. No. 4,469,546, issued Sept. 4, 1984 to Klose.

The final assembly portion includes a pair of disc members 13 mounted upon the common ends of a pair of coaxial shafts 14. While not shown in the drawings, shafts 14 have a threaded rod positioned therein with nuts mounted on the rod for moving the shafts 14 and disc members 13 towards and away from one another.

The green tire assembly is positioned on the disc members 13. Disc members 13 are moved apart to enable the disc members to engage an annular bead previously formed on each end of the green tire carcass. The green tire carcass is inflated which draws the bead area into sealing engagement with disc members 13, while at the same time giving the green tire assembly a partial toroidal shape illustrated by green tire assembly 15 in FIG. 1. Further details regarding the operation of disc members 13 may be seen by reference to U.S. Pat. No. 4,402,782, issued Sept. 6, 1983 to Klose et al.

Tranfer ring 12 moves the belt and tread stock package from drum 10 to position the package over green tire carcass 15. The green tire carcass is inflated to expand the carcass into engagement with the belt and tread stock package. Transfer ring 12 is then collapsed radially outward to release the belt and tread stock package.

After transfer ring 12 has been collapsed and moved laterally to its inactive position, a stitching mechanism 16 and the fully assembled green tire are brought into mutual engagement. "Stitching" is then performed by rolling rigid stitcher wheels over the surface of the green tire assembly to bring the tacky surfaces of the assembled green tire carcass elements into intimate contact and to work out any entrained air. After stitching, the green tire is removed from the disc members 13 and taken away from the building machine for further processing.

Building drum 10 has positioned adjacent thereto a tread stock servicer 18 in accordance with the present invention, the servicer including a conveyor means 20 for delivery of tread stock to the building drum 10. Servicer 18 aligns the tread stock material for placement onto the belts previously assembled on building drum 10.

Figure 2:
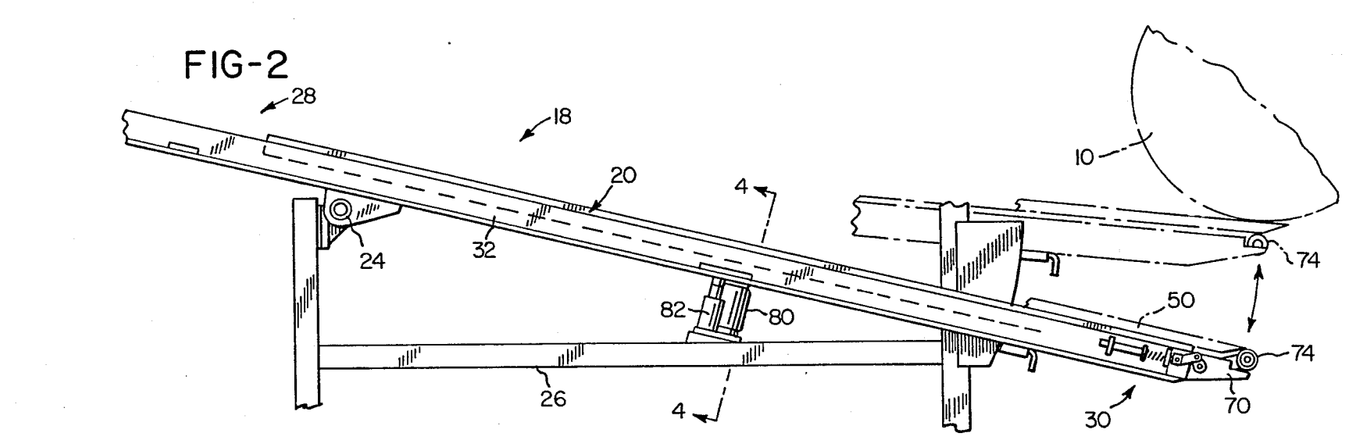
FIG. 2 is a side view of a tread stock servicer used with the method and forming a portion of the apparatus.

One embodiment of tread stock servicer 18 may be seen in greater detail in FIG. 2. The servicer is connected by pivotal mount 24 to a supporting frame 26. Servicer 18 is positioned in an inclined orientation, having a raised upper loading end 28 and a lower delivery end 30. Delivery end 30 is positioned generally beneath the tire building drum 10 and any belts carried thereon.

Figure 3:
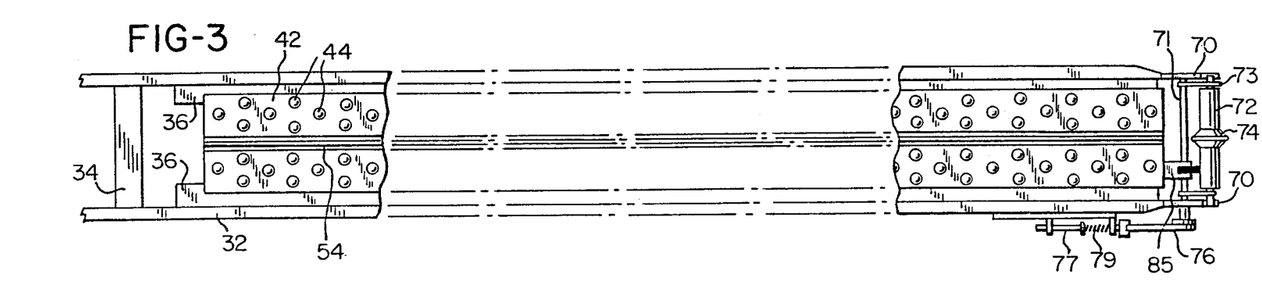
FIG. 3 is a plan view of the servicer of FIG. 2.
Figure 4:
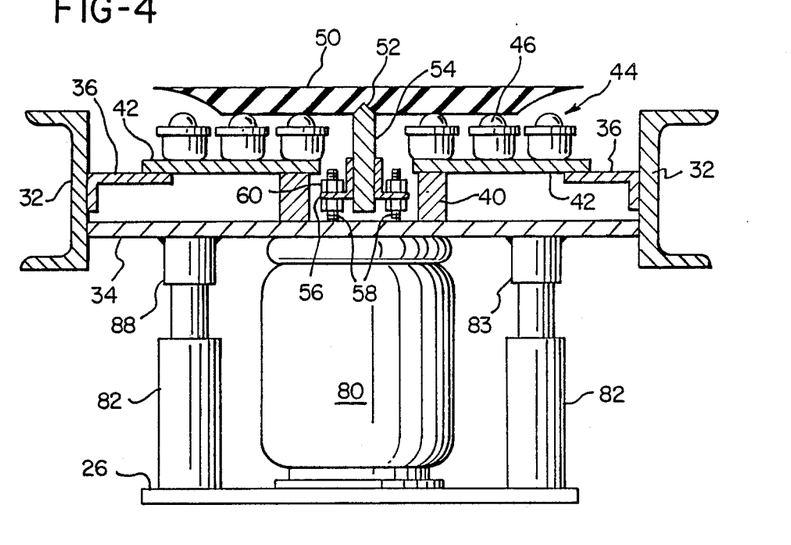
FIG. 4 is a a sectional view of the servicer of FIG. 3, taken generally along line 4—4 of FIG. 2.

The servicer 18 is further illustrated in FIGS. 3 and 4. As is shown, servicer 18 includes a pair of parallel channel side members 32 extending the full length of the servicer. The side members are connected by a plurality of transverse braces 34, and an elongated bracket 36 extends inwardly from each of the side members. Further, supported on transverse braces 34 are inner supports 40 (see FIG. 4).

One bracket 36 and one support 40 together support one of a pair of elongated conveyor plates 42. Each conveyor plate 42 in turn defines a base for a plurality of ball rollers 44. As can be appreciated, each roller 44 constitutes a ball 46 for rotation within a retainer cup 48. Balls 46 together cooperate to define a planar movement surface along which a length of tread stock 50 may be moved downwardly along servicer 18.

Other alternatives may be used to define the planar movement surface. For example, cylindrical rollers or driven conveyor belts may be provided to carry the stock toward the building drum. Further variations will be readily apparant to those skilled in the art.

In order to provide proper centering alignment for tread stock 50, a centering mark in the form of groove 52 is previously formed down the entire length of the outer face of the tread stock material, preferably at the same time that the stock is initially formed or extruded. The outer face, which will later have the tire tread pattern formed thereon, as well as groove 52, is positioned downwardly as the tread stock is located on servicer 18.

The center groove 52 may be replaced by any other appropriate mark, such as a ridge, which may be conveniently formed at the time the stock is extruded. Such a mark need not be centered on the tread stock, although such centering enables the tread to be positioned on the servicer 18 in either direction. It will further be recognized that the mark may be formed with a variety of cross-sectional shapes other than the V-shape illustrated by groove 52. For example, the mark could have a rectangular cross section similar to those shown in FIGS. 10 and 11.

An upright centering plate 54 is disposed between the conveyor plares 42 supporting ball rollers 44. Plate 54 is provided with a matching upper edge for cooperation with the groove 52 formed in the tread stock material. A pair of angle brackets 56 support plate 54, with brackets 56 in turn being supported by threaded shafts 58 from braces 34. Nuts 60 secure brackets 56 at a distance above braces 34, and serve as an adjustment means for the extent to which plate 54 projects outwardly from the movement surface for the tread stock.

In the event a centering mark is located on the tread stock in other than a centered position, it will be recognized that plate 54 will be located correspondingly off-center along servicer 18.

Thus, the building machine operator, when loading a section of stock onto servicer 18, positions the stock with the upper, beveled end of plate 54 engaged with groove 52. This provides a clear indication to the operator that the stock is properly centered. As the tread stock moves downwardly along the conveyor of servicer 18, plate 54 remains engaged with groove 52, holding the stock in a precise and properly centered position.

As seen in FIGS. 2 and 3, a delivery end bracket 70 extends from the lower end of each side member 32 of servicer 18. A shaft 71 is mounted for rotation between brackets 70 and supports a pair of arms 73 which in turn rotatably support a guide roller 72. Roller 72 includes an annular central ridge 74 that is sized to cooperate with the groove 52 formed on the outer face of the tread stock. Ridge 74 is aligned with plate 54 extending along the length of the servicer 18.

Figure 2A:
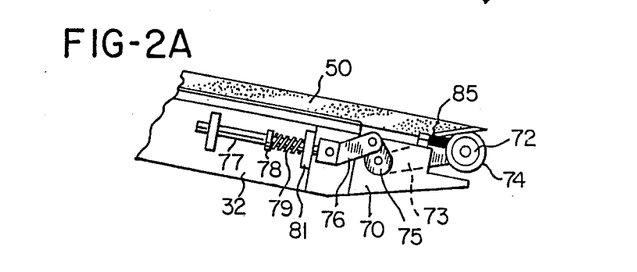
FIG. 2A is a view showing an enlarged portion of the servicer shown in FIG. 2, illustrating the guide roller and stop mechanism located at the delivery end of the servicer.

Referring now to FIG. 2A, shaft 71 additionally supports a crank wheel 75 to which a crank lever 76 is pivotally attached. Lever 76 is then pivotally connected to rod 77 slidably mounted with respect to one side member 32 of servicer 18. A collar 78 attached to rod 77 retains a spring 79 between collar 78 and mounting plate 81. Spring 79 urges rod 77 away from the delivery end of the servicer, causing lever 76 to rotate wheel 75 and rod 71. This in turn raises roller 72 supported by brackets 73.

Raising of roller 72 as described brings roller 72 into contact with a stop member 85 fixed to servicer 18. (See also FIG. 3.) Stop member 18 is fitted with a resilient tip which, when in contact with roller 72, prevents any rotation of roller 72.

Referring now to FIGS. 2 and 4, a lift mechanism is provided for raising the delivery end of tread stock servicer 18. As best seen in FIG. 4, the lift mechanism includes an air cylinder 80 connected between frame 26 and one transverse brace 34 of servicer 18. A pair of guides 82 are also provided, each secured to both frame 26 and brace 34. As air pressure within cylinder 80 is reduced, the weight of servicer 18 causes the servicer to pivotally lower about mounting 24, guides 82 ensuring that motion of the frame is vertical without unwanted side-to-side movement. A raised collar 83 on each guide 82 acts as a stop for downward motion, with such motion halting once the collar 83 contacts the lower portion of guide 82.

In operation, the tread stock servicer is initially placed in its lowered position, shown in FIG. 2. Tread stock is positioned on the servicer and is centered by positioning the center groove 52 on the guide member 54. The tread stock then moves by gravity over ball rollers 44, until the leading edge of the tread stock comes to rest against guide roller 72. Roller 72 is at this time raised at least partially into the path of the tread stock and prevented from rotation by stop member 85. Thus, the leading edge of the stock will abut the roller 72 with annular ridge 74 registering with the center groove on the stock, thereby halting the stock and maintaining it in a centered position.

An operator next directs air under pressure to cylinder 80 through the actuation of a suitable control, which causes the servicer to pivot about connection 24 to elevate servicer 18. When moved to its raised or operating position, shown in broken lines in FIG. 2, servicer 18 holds the leading edge of the stock against a belt package previously assembled on building drum 10. Because the inner, uppermost surface of the tread stock is formed from material which is tacky or of an adhesive nature, it will adhere to the surface of the belts placed on drum 10 when engaged therewith.

As the leading edge of the tread stock is pressed into contact with the tacky surface of the belt package, roller 72 is forced downwardly by rotation of support arms 73 and shaft 71. This moves roller 72 away from stop member 85, thereby releasing roller 72 for rotation. (At the same time, rotation of shaft 71 causes rod 77 to be drawn toward the delivery end of the service, whereupon collar 78 and mounting plate 81 cooperate to compress spring 79. Thus, when the servicer is subsequently lowered, spring 79 will urge roller 72 back into contact with stop member 85.)

Building drum 10 is next caused to rotate slowly in a counterclockwise direction (with respect to FIG. 2). Rotation of the drum thus draws the tread stock off the servicer and onto the drum. Raised ridge 74 of roller 72 extends slightly above the height of centering plate 54 or wheels 66, so that the stock is slightly raised as it passes over roller 72. The upward movement imparted to the leading edge of the tread stock by engagement of the ridge 74 on guide roller 72 with the stock tends to adhere the leading portion of the stock on the belts (or green tire carcass) carried on the drum. During the withdrawal of tread stock from the delivery end of the servicer, ridge 74 will continue to move along the center groove in the tread stock, thereby ensuring the proper positioning and alignment on the drum.

It will be noticed that the arrangement for servicer 18 disclosed herein results in the tread stock being fully supported immediately beneath the point at which the stock is placed onto the belt package carried on the building drum 10. This is important, since such support enables the stock to be positioned in a centered fashion with significantly greater control and, hence, precision.

Several alternative embodiments for the tread servicer of the present invention are partially shown in FIGS. 5–8. Only the upper, loading end portion of the servicers is shown in the drawings, it being understood that the remaining portions will be identical to that depicted, and that the delivery end mechanism and support structure will be identical to that described above for servicer 18.

Figure 5:
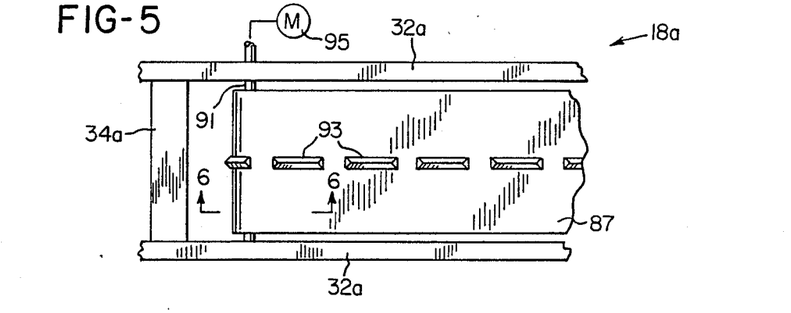
FIG. 5 is a plan view of a portion of a tread stock servicer, illustrating an alternative embodiment for the servicer.
Figure 6:
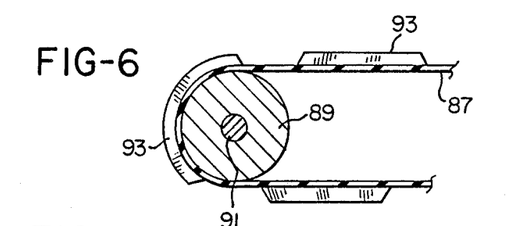
FIG. 6 is a side sectional view taken generally along line 6—6 of FIG. 5.

Referring now to FIGS. 5 and 6, a servicer 18a is shown wherein tread stock is conveyed by an endless belt 87. Belt 87 is supported at its upper end by a roller 89, which is in turn supported by shaft 91 extending between side members 32a. Located centrally along the entire length of belt 87 is a series of ridge segments 93. Each segment 93 is formed from a hard but flexible rubber or plastic material to enable the segment to pass around the end of the belt path, and is provided with an upper cross-sectional shape corresponding to central groove formed along the length of the tread stock.

In operation, belt 87 is driven by rotation of roller 89 through a drive motor 95. A length of tread stock is positioned on belt 87 with the central groove in the stock engaged with the ridge segments 93. The stock is carried along the servicer 18a, and is retained in its centered position by segments 93 so that the stock arrives beneath the building drum (see FIG. 2) properly located for attachment to the belt package carried on the drum.

Figure 7:
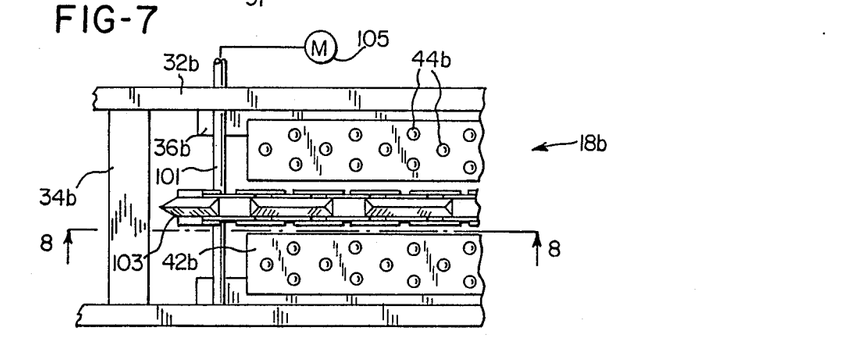
FIG. 7 is a plan view of a portion of a tread stock servicer, illustrating a further alternative embodiment for the servicer.
Figure 8:
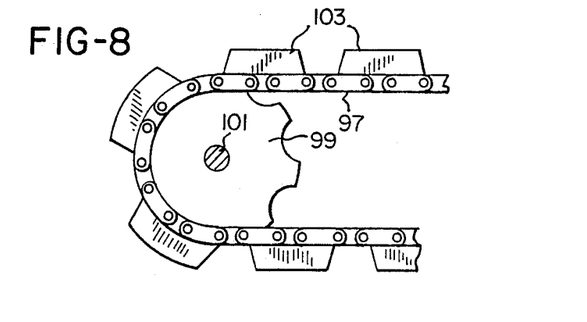
FIG. 8 is a side sectional view taken generally along line 8—8 of FIG. 7.

A second alternative embodiment is shown in FIGS. 7 and 8. A belt servicer 18b is provided wherein the conveyor structure includes a plurality of ball rollers 44b mounted to a pair of elongated conveyor plates 42b. An endless chain 97 is disposed between conveyor plates 42b, and passes around a sprocket wheel 99 carried on a shaft 101 extending between side members 32b. Secured to the links of chain 97 is a plurality of ridge segments 103 similar to segments 93 provided for the embodiment of FIGS. 5 and 6. Chain 97 is driven by a motor 105 connected to shaft 101. A length of tread stock positioned on servicer 18b is both advanced and aligned by chain 97 and segments 103 carried thereon as the stock is moved along ball rollers 44b.

It will also be recognized that either of the embodiments shown in FIGS. 5–8 may be used with means for engaging the centering groove in the stock other than the segments disclosed herein. For example, a plurality of relatively closely-spaced, upright pins could be used, either with belt 87 or chain 97.

After the stock has been properly positioned on the belt package and the end splice of the tread stock has been secured, the belt and tread stock package is moved by the transfer ring 12 shown in FIG. 1 from drum 10 and toward the disc members 13. Prior to such movement, disc members 13 are first moved into close relationship to accomodate the placing of a previously assembled green tire carcass thereon, following which placement the disc members 13 are moved apart into engagement with the bead ring portions of said green tire carcass. With the bead ring portions engaged with the disc members 13, air is introduced into the space defined by the green tire carcass and disc members 13 while the disc members are made to approach one another, thereby causing the green tire carcass to assume a partially toroidal shape.

Transfer ring 12 moves the belt and tread stock package over the partially inflated green tire carcass, halting with the belt and tread stock package properly positioned for placement onto the green tire carcass. The green tire carcass is then further inflated, during which time disc members 13 are moved together additionally to cause the green tire to expand into a more toroidal shape. The expansion causes the outer circumferential surface of the green tire carcass to engage the inner surface of the belt and tread stock package. Transfer ring 12 is then collapsed radially outward and returns laterally to its inactive position. The stitching operation is then performed using stitcher mechanism 16.

Figure 9:
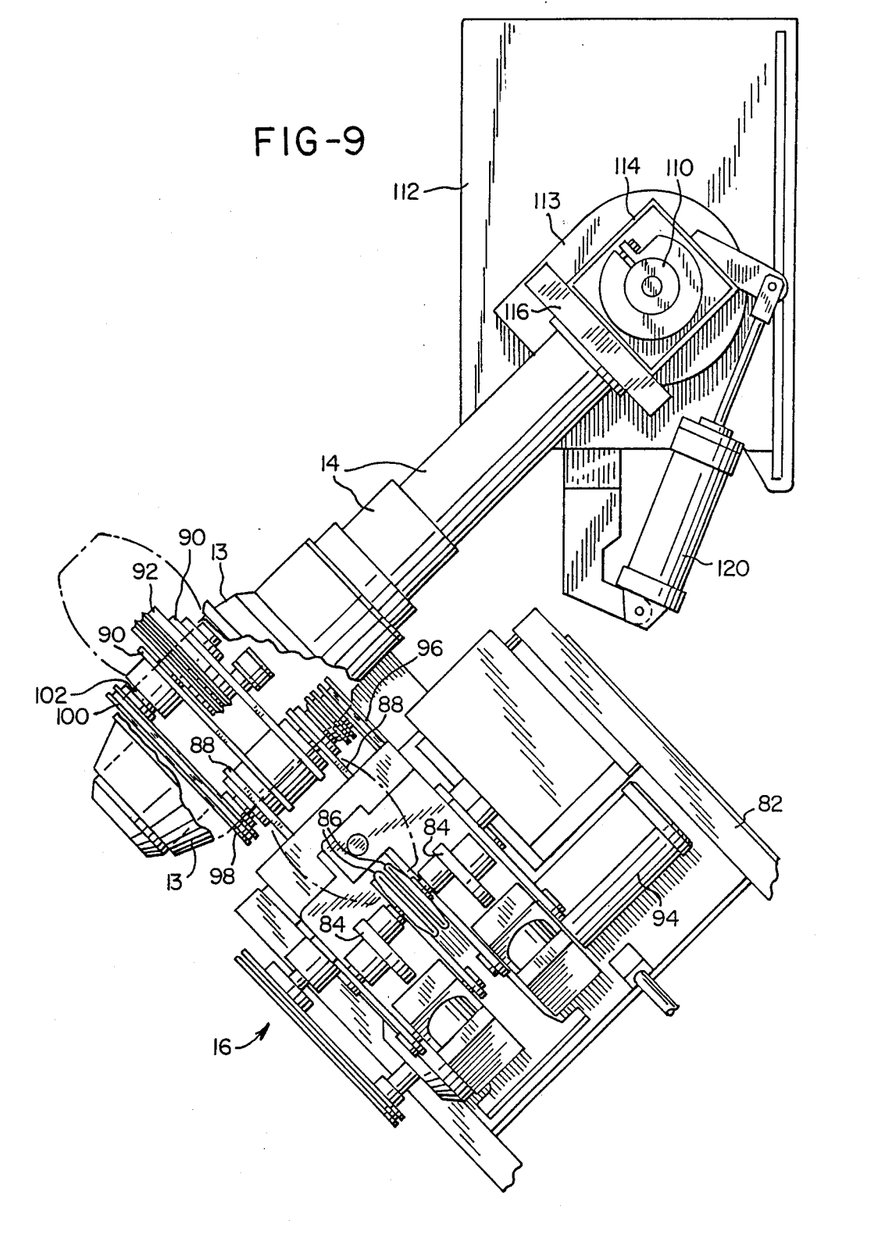
FIG. 9 is an enlarged plan view of the stitcher mechanism forming a portion of the apparatus of FIG. 1.

Referring to FIG. 9, stitcher mechanism 16 is shown in detail, and includes a base 82 which supports a pair of upwardly extending arms 84. Each arm in turn carries one of a pair of conventional stitcher wheels 86 which are manipulated by arms 84 in a conventional manner. Once stitching of the central portion of the green tire has been completed, as will be described, arms 84 move wheels 86 into contact with the assembled green tire for stitching of the outer portions of the green tire. Further details regarding the operation of this portion of stitcher mechanism 16, which is conventional, may be found by reference to U.S. Pat. No. 4,306,931, issued Dec. 22, 1981 to Klose, and which is hereby incorporated by reference.

The forward end of stitcher frame 82 supports a pair of forwardly extending parallel arms 88 which function as supports for a second pair of parallel arms 90. Mounted at the forwardmost ends of arms 90 is a stitcher/drive wheel 92. A drive motor 94 located near the rear of base 82 and a cooperating drive belt 96 connecte with a pulley mounted onto a shaft 98 extending through the pivotal connection between arms 88 and 90. A second drive belt 100 connects 98 with a shaft 102 supporting stitcher/drive wheel 92. Thus, wheel 92 is driven for rotation by motor 94.

In operation, stitcher/drive wheel 92 is initially positioned below and brought upwardly into contact with the surface of an assembled green tire. To accomplish this, arms 90 supporting wheel 92 are provided with suitable means including a selectively engageable clutch for rotating the arms to enable wheel 92 to contact tires of various diameters.

Referring briefly back to FIG. 1, it can be seen that disc members 13 initially receive a green tire in a position which does not permit the engaging of the green tire by the stitcher mechanism 16. However, disc members 13 are shown in FIG. 9 properly positioned for the stitching operation. To accomplish this, an upright post 110 is mounted to a base 112 which is fixed with respect to the overall building machine frame. A pivot plate 113 and a hollow column 114 extending upawardly therefrom are placed onto post 110 for rotation about the post. A mounting plate 116 is attached to column 114 and supports concentric shafts 14.

A cylinder and piston 120 are connected between column 114 and frame 112 for pivotal movement of column 114 around post 110. Cylinder and piston 120 are selected to provide a proper amount of movement for column 114 to move the assembled green tire from the position shown in FIG. 1 to that shown in FIG. 9.

Upon placement of a green tire carcass 15 onto disc members 13, asssembly of the belt and tread stock package thereonto, and movement of the assembled green tire to the position shown in FIG. 9, arms 90 of stitcher mechanism 16 are pivotally raised to bring stitcher/drive wheel 92 into contact with the assembled green tire. Drive motor 94 then causes stitcher/drive wheel 92 to rotate, which in turn rotates the assembled green tire, along with the disc members 13 about shafts 14. Thus, it can be seen that wheel 92 functions both as a stitcher wheel and as a drive wheel for the assembled green tire.

Upon the completition of the stitching in the center or median portion of the green tire by the stitcher drive wheel, the two conventional stitcher wheels 86 are brought into engagement with the green tire which is still rotatably driven by the stitcher/drive wheel 92. Wheels 86 are moved gradually outwardly by arms 84 along the green tire contoured surface during the stitcher operation to complete the stitching of the entire green tire.

Figure 10:
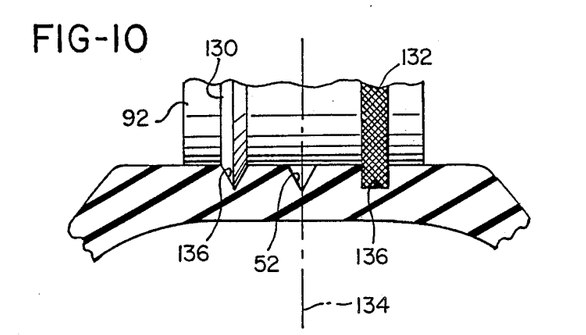
FIG. 10 is a further enlarged portion of a stitcher wheel of the apparatus of FIG. 9, shown operating upon a portion of a green tire.

An enlarged view of stitcher/drive wheel 92 while in contact with an assembled green tire 15 is shown in FIG. 10. It should be noted that the surface of stitcher/drive wheel 92 is provided with a pair of alternative design annular ridges 130 and 132, each of which is spaced equidistantly from the centerline 134 of the green tire supported by disc members 13. Ridge 130 is shown as a peaked ridge having a triangular cross section, while ridge 132 has a rectangular cross section and a flat, knurled or otherwise roughened outer surface. Either alternative may be used and is regarded as preferred, although other configurations for the ridge may be usable. Further, it will be recognized that ordinarily, contrary to what is actually shown in FIG. 10, only a single type of ridge will generally be used for both ridges on a single stitcher/drive wheel 92. However, it may be desirable in some cases to provide two different configurations for the ridges, for example, where a record is needed of the direction in which the green tire was mounted to disc members 13 for stitching.

During stitching of the central portion of the green tire with stitcher/drive wheel 92, ridges 130 and 132 will form annular alignment marks or grooves 136 into the tread stock. These gooves 136 will be similar to the central groove 52 already formed into the tread stock prior to its positioning on the green tire.

Since a properly assembled green tire will have the tread stock centered on the green tire carcass, groove 52 after stitching should lie directly along the tire centerline 134. Further, since grooves 136 are cut with equal spacing away from the theoretical tire centerline, grooves 136 should be equally spaced from groove 52 along the entire circumference of the green tire.

Thus, following the stitching operation, a clear indication is presented as to whether the green tire has been properly assembled. These grooves, equally spaced, should be formed around the entire circumference of the green tire. Any deviation in the spacing between center groove 52 and outer grooves 136 will indicate that the tread stock or the underlying belts have been improperly applied or displaced during the final assembly or consolidation process.

Figure 11:
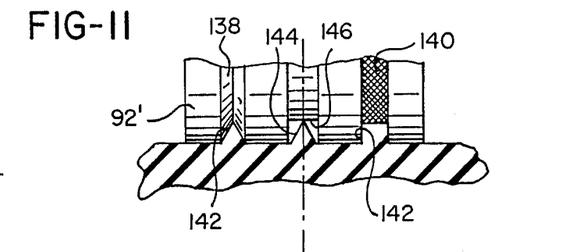
FIG. 11 is a view similar to FIG. 10, showing an alternate embodiment for the stitcher wheel.

It will be recognized that a variety of further alternatives to those shown in FIG. 10 are available for ridges 130 and 132. For example, as shown in FIG. 11, a stitcher/drive wheel 92' may include grooves 138 and 140 rather than ridges. In such a case, the movement of stitcher/drive wheel 92' over the surface of the assembled green tire 15 causes the material of the tread stock to be forced into the grooves 138 and 140 to form alignment marks appearing as ridges 142 in the stitched tire. As with the ridges 130 and 132 shown in FIG. 10, grooves 138 and 140 illustrate two embodiments for the grooves, groove 138 having a V-shape cross section and groove 140 having a rectangular cross section. Various other cross sections can be used.

FIG. 11 also illustrates an assembled green tire wherein the centering mark formed into the tread stock prior to its assembly onto te green tire carcass is a ridge 144 rather than a groove. In such a case, the stitcher/drive wheel 92' may require a recessed portion 146 along its central portion to avoid obliterating the centering ridge 144 during stitching.

The relative positions of the alignment marks, whether grooves or marks, can be readily monitored by a variety of available methods. For example, the machine operator may visually scan the marks. Variations in the three-mark pattern will be easily observable. An optical follower could be provided using light beams to track the marks, or in the case of grooves, a mechanical follower could be inserted into the grooves as the green tire is rotated. Other alternatives will be readIly apparent to those skilled in the art.

It should be recognized that it is not necessary that grooves 136 or ridges 142 be defined by a wheel also functioning as a stitcher wheel or as a drive wheel. A mark-forming wheel or scribing means could be mounted in a separate machine for forming the marks, or a separate mark forming wheel could be included in the stitcher apparatus. Of course, combining a mark forming wheel into a combined drive and stitcher wheel is regarded as preferred as making most efficient use of the tire building apparatus.

It is also not necessary that marke in the form of ridges or even grooves be formed using a wheel. A fixed member could be positioned near the mounted green tire and moved into contact with the green tire surface as the tire is rotated. Ridges, grooves or other alignment marks could thus be scribed into the surface of the tire.

The alignment marks described herein can also be formed in a manner which simply marks the tire surface without displacing any of the rubber material of the tire. For example, small spray nozzles could be located near the green tire surface during rotation of the tire. Paint is then delivered to the nozzles to place a relatively thin line of paint around the tire periphery. The painted alignment marks may then be read in the same manner as in the case of grooves or ridges. Of course, marking substances other than paint, such as inks, may also be used. These marks will either be obliterated during the molding and curing process, or will wear off shortly after the fininished tire has been placed into use. Where no evidence of the alignment marks is desired, special paints or inks visible only under ultraviolet illumination can be used, with an appropriate lamp mounted near the stitcher machine or whereever analysis of the tire alignment is to be carried out.

Paint, ink or other marking substances may, of course, also be used for the central mark formed on the tread stock and with which the alignment marks are to be compared. A spray nozzle can be mounted near the extruding machine used to form the tread stock to provide the centering mark.

It should also be recognized that it is not necessary to provide two alignment marks along the surface of the assembled green tire. A single mark could be formed, with the spacing of such a mark from the center groove 52 providing an indication of the accuracy of the positioning of the tread stock on the green tire carcass. In such a case, however, it becomes necessary to actually measure the spacing between the mark and the center groove, since deviations will be less readily apparent in visual observation, which may result in less efficient monitoring of the assembled green tire. It may also be desirable in some cases to provide more than two alignment marks.

It is also not necessary that the stitcher wheel with grooves or ridges and the tread servicer apparatus as described herein be used together in the same tire building machine. Either may be used independently, although the same central groove or ridge previously formed or applied into the tread stock and used in centering the tread stock on the servicer may be used as the centering mark for monitoring the proper application of the tread.

After the stitching operation is performed to firmly secure the parts of the assembled green tire, the tire is removed from the building machine and taken to another location for further processing.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. Tire building apparatus for application of a length of tread stock to the periphery of a belt package for subsequent assembly onto a green tire carcass, the tread stock having an outer face and an inner face, said outer face defining a centering groove along the length of the stock, said apparatus comprising:
   a cylindrical drum for mounting the belt package;
   means for mounting said drum for circumferential rotation about a horizontal axis;
   an elongated servicer means having a frame defining a delivery end and a loading end for delivering and directing said tread stock to said drum;
   stationary conveyor means located on said servicer means for defining a planar movement surface onto which said tread stock may be placed and over which said tread stock may be moved from said loading end to said delivery end;

means for retaining said tread stock in a centered position along said servicer during movement of said stock along said servicer, including an elongated plate disposed edgewise along a central line defined along the length of said servicer means, the upper periphery of said plate defining a shape for cooperating with said centering groove to engage said groove as said stock is moved therepast;

means for supporting said servicer means with said delivery end lower than said loading end; and means for supporting said servicer means in a working position with said delivery end disposed beneath said drum and spaced apart therefrom by a distance slightly greater than a thickness of said tread stock, said servicer means being supported at an angle with respect to said drum such that the tread stock carried on said servicer means contacts a lower portion of said drum along a line tangent to the periphery of said drum, whereby stock approaches the belt package supported on said drum with said outer face down and away from the drum for application of the tread stock to the belt package.

2. Apparatus as defined in claim 1, wherein said conveyor means includes a support member attached to said frame, and a plurality of ball rollers carried on said support member.

3. Apparatus as defined in claim 1, wherein said servicer means further includes at least one guide roller disposed perpendicular at said delivery end for guiding the stock onto the carcass on said drum.

4. Apparatus as defined in claim 3, wherein said guide roller defines an annular engagement means extending about the circumference of said guide roller, said engagement means being centered on said guide roller for engagement of said centering mark on the tread stock moved therepast.

5. Apparatus as defined in claim 1, further comprising means for moving said servicer means to and from said working position by raising said delivery end toward said drum and lowering said delivery end away from said drum.

6. Apparatus as defined in claim 5, wherein said servicer means is pivotally connected to said frame near said loading end, and wherein said moving means causes pivotal movement of said servicer means with respect to said frame.

7. Tire building apparatus for application of a length of tread stock to the periphery of a green tire carcass, the tread stock having an outer face and an inner face, said outer face defining a centering groove along the length of the stock, said apparatus comprising:

a cylindrical drum for mounting the green tire carcass;

means for mounting said drum for circumferential rotation about a horizontal axis;

an elongated servicer means having a frame defining a delivery end and a loading end for delivering and directing said tread stock to said drum;

stationary conveyor means located on said servicer means for defining a planar movement surface onto which said tread stock may be placed and over which said tread stock may be moved from said loading end to said delivery end;

means for retaining said tread stock in a centered position along said servicer during movement of said stock along said servicer, including an elongated plate disposed edgewise along a central line defined along the length of said servicer means, the upper periphery of said plate defining a shape for cooperating with said centering groove to engage said groove as said stock is moved therepast;

means for supporting said servicer means with said delivery end lower than said loading end; and means for supporting said servicer means in a working position with said delivery end disposed beneath said drum and spaced apart therefrom by a distance slightly greater than a thickness of said tread stock, said servicer means being supported at an angle with respect to said drum such that the tread stock carried on said servicer means contacts a lower portion of said drum along a line tangent to the periphery of said drum, whereby stock approaches the green tire carcass supported on said drum with said outer face down and away from the drum for application of the tread stock to the green tire carcass.

8. Apparatus as defined in claim 7, wherein said conveyor means includes a support member attached to said frame, and a plurality of ball rollers carried on said support member.

9. Apparatus as defined in claim 7, wherein said servicer means further includes at least one guide roller disposed perpendicular at said delivery end for guiding the stock onto the carcass on said drum.

10. Apparatus as defined in claim 9, wherein said guide roller defines an annular engagement means extending about the circumference of said guide roller, said engagement means being centered on said guide roller for engagement of said centering mark on the tread stock moved therepast.

11. Apparatus as defined in claim 7, further comprising means for moving said servicer means to and from said working position by raising said delivery end toward said drum and lowering said delivery end away from said drum.

12. Apparatus as defined in claim 11, wherein said servicer means is pivotally connected to said frame near said loading end, and wherein said moving means causes pivotal movement of said servicer means with respect to said frame.

* * * * *